3,393,185
BIAXIALLY ORIENTED STYRENE/METHYL
METHACRYLATE COPOLYMER FILMS
Henno Keskkula and Jacob Eichhorn, Midland, Mich.,
assignors to The Dow Chemical Company, Midland,
Mich., a corporation of Delaware
No Drawing. Filed June 18, 1965, Ser. No. 465,178
2 Claims. (Cl. 260—86.7)

ABSTRACT OF THE DISCLOSURE

A biaxially oriented packaging film of a resinous copolymer comprised of about 50 to about 70 percent by weight of methyl methcrylate and about 30 to about 50 percent by weight of styrene, said film being from 0.1 to 3 mils thick and characterized by a low noise level when flexed.

---

This invention relates to the films for packaging articles of commerce having a volatile constituent and more particularly to biaxially oriented films of copolymers of a major proportion of methyl methacrylate and minor proportion of styrene.

Polystyrene is known to possess a number of properties such as transparency, good dielectric characteristics and resistance to attack by alcohols, acids, or alkalies, which render it valuable as a plastic material for the manufacture of molded articles or films suitable for a variety of applications, e.g., as film for wrapping articles of commerce.

However, polystyrene films having thicknesses between about 0.5 and 3 mils, also have certain characteristics which are disadvantageous or undesirable and tend to restrict their field of use and may even prohibit their use for some purposes. A particular disadvantage or undesirable characteristic of polystyrene film is its metallic ring or crackle when flexed which results in appreciable noise that is disturbing to individuals.

It has now been discovered that films having a thickness between about 0.5 and 3 mils, comprised of biaxially oriented copolymers of a major proportion by weight of methyl methacrylate and a minor proportion of styrene produce substantially less noise when flexed than similar oriented films of polystyrene.

According to the invention the films can be prepared from resinous polymeric copolymers of from about 50 to about 70 percent by weight of methyl methacrylate and from about 30 to about 50 percent of styrene. The polymers are normally solid resinous materials having a molecular weight of 30,000 or greater, preferably a molecular weight between about 30,000 and 150,000 as determined by the well known Staudinger viscosity method.

The biaxially oriented films of the copolymers can be prepared in known ways such as by heat-plastifying and pressing the resinous copolymer as by molding into thin sheets having a desired thickness which are thereafter stretched in longitudinal and transverse directions while in a heat-plastified condition, then cooled.

In practice, a sheet of the copolymer of from 15 to 50 mils thick is heat-plastified by heating the same to temperatures between 225° and 275° F., then stretched by pulling the edges in two mutually perpendicular directions to effect molecular orientation at a stretch ratio of 3:1 to 8:1 and then cooled.

The methyl methacrylate/stryene copolymer compositions of the present invention may be prepared by methods conventionally employed in the art for copolymerizing vinyl compounds, e.g., in bulk, in solution and in aqueaus emulsion. A particularly desirable procedure for the preparation of the methyl methacrylate/styrene copolymers useful in the preparation of the films of the present invention is to react about 50 to about 70 percent by weight methyl methacrylate with about 30 to about 50 percent by weight styrene at a temperature of between 120 and 170° C. in a recirculating coil reactor in accordance with the continuous polymerization process disclosed in U.S. 2,769,804.

Additives such as small amounts of plasticizing agents, lubricants, antioxidants, stabilizing agents, colors, dyes or pigments may be incorporated with the polymer prior to making the oriented film, but the employment of such additives is not required in the invention. The additives, when employed, are usually incorporated with the polymer in amounts corresponding to from 0.1 to 10 percent by weight.

The biaxially oriented methyl methacrylate/styrene copolymer films of the present invention possess good transparency, excellent dielectric characteristics, and resistance to attack by alcohols, acids, or alkalies. The films produce substantially less noise when flexed or shaken than similar films of polystyrene. The compositions of the invention are suitable for packaging fruits, vegetables and similar types of foodstuff and comestibles such as meats and cheeses as well as numerous other articles of commerce which it is desired to maintain in a fresh condition.

Comestibles such as lettuce, cauliflower and cabbage may be packaged at the grower level with the films of the present invention which excludes air and retards the loss of $CO_2$ and moisture vapor from the foodstuff and enables the producer to deliver the produce in a prime condtion to the consumer.

The following examples illustrate ways in which the principle of the invention has been applied but is not to be construed as limiting its scope.

EXAMPLE 1

In each of a series of experiments, copolymers containing various amounts of methyl methacrylate (MMA) and styrene, as identified in the following table were compression molded at a temperature between 350° to 405° F. at a pressure of 350 to 395 p.s.i. into 4⁷⁄₁₆″ x 4⁷⁄₁₆″ x 0.018″ sheets. The sheets were biaxially stretched four times their original dimensions in both machine and transverse directions at a temperature ranging from 240° to 260° F. to obtain films about 1 mil thick after cooling the stretched film. Rectangular test pieces having the dimensions 5 x 7 inches were cut from the stretched film. These test pieces were used to determine a noise level for the film.

The procedure for determining the noise level was carried out on an apparatus located in a sound-proofed room. The test piece of film was mounted between two parallel, vertically spaced, horizontal metal bars with cellulose arhesive tape. The lower bar was stationary. The upper bar was attached at one end to a coil spring mounted in a fixed support, and at the other end to a wire. The wire passed through a wall of the room and was fastened to a cam mounted on the end of a motor driven shaft. The cam was rotated at a speed of 60 r.p.m. As the motor driven cam was turned, the upper bar and the attached upper edge of the film moved horizontally in the plane of the film and flexed the film with respect to the fixed lower edge. The noise made by flexing the film in this manner was picked up by a microphone inside the room and recorded on a tape recorder. The noise level produced by the shaken film was obtained by feeding the electrical impulse output from the tape to a Hewlett Packard Distortion Analyzer Model 330B. The output from this analyzer in volts is proportional to the energy level of the noise of the film in the frequency band being tested. The noise level was obtained over the band of frequencies per second of: 2–100; 100–200; 200–500; 500–1,000; 1,000–2,000; 2,000–5,000; 5,000–10,000 and 10,000–20,000. A correction was made for background noise when testing the film.

The noise level of a biaxially oriented polystyrene film prepared by a conventional blown bubble process was used as a standard of comparison.

The percentage decrease in noise level observed for the biaxially oriented styrene/MMA copolymer films when compared with the biaxially oriented polystyrene film was recorded and is summarized in Table I below. The table identifies the film by designating the copolymer composition from which it was prepared and includes the thickness in mils of the biaxially oriented film tested. The value reported in Table I is the average for tests on 3 pieces of each film.

TABLE I

| | Film | | |
|---|---|---|---|
| | Styrene/MMA Copolymer Composition (Percent) | Thickness, mils | Percent Decrease In Noise Level |
| Test No.: | | | |
| 1 | 35/65 | 0.9 | 62 |
| 2 | 45/55 | 0.7–1.2 | 69 |
| 3 | 65/35 | 1.0–1.1 | 14 |
| 4 | 90/10 | 1.0 | 0 |

By referring to Table I it is at once apparent that biaxially oriented copolymer films of the present invention (test numbers 1 and 2) show a substantial decrease in noise level over biaxially oriented films comprised of a minor proportion of methyl methacrylate, i.e., less than 50 percent by weight and a mapor proportion of styrene (test numbers 3 and 4) which are outside the scope of the present invention.

EXAMPLE 2

Biaxially oriented films comprised of styrene copolymerized with a variety of different acrylate containing monomers were prepared following the general procedure of Example 1. The copolymers were biaxially stretched to one mil film at a 7.2 x 7.2 stretch ratio.

The noise level of the films was determined by a panel of 6 persons operating individually. Each film the identity of which was unknown to the panel members was handled and rattled by the members of the panel. Each film was rated according to a scale which ranged from 1 to 5 wherein, 1 was the best or quietest film and 5 was the worst or noisiest film. After the evaluation, the results for each sample were compiled and the average ratings are shown in Table II below.

TABLE II

| Film Composition—Monomer Copolymerized with Styrene | Amount of Comonomer Copolymerized with Styrene | Average Noise Rating By Panel |
|---|---|---|
| Film Sample: | | |
| A — Polystyrene | 0 | 4.9 |
| B — 2-ethylhexyl Acrylate | 20 | 3.4 |
| C — Cyclohexyl Acrylate | 40 | 3.1 |
| D — Methyl Methacrylate | 65 | 1.0 |

By referring to Table II it is at once apparent that the biaxially oriented styrene/MMA copolymer film of the present invention (film sample D) shows a substantial decrease in noise level when compared to other films fabricated from copolymers of sytrene and other acrylate monomers. Films fabricated from copolymers comprised of styrene and other acrylate monomers in amounts equivalent to that of film sample D of Table II are generally too soft and exhibit severe blocking properties which render the films unsuitable for practical packaging applications.

What is claimed is:

1. A biaxially oriented packaging film of a resinous copolymer comprised of about 50 to about 70 percent by weight of methyl methacrylate and about 30 to about 50 percent by weight of styrene, said film being from 0.5 to 3 mils thick and characterized by a low noise level when flexed.

2. The film of claim 1 wherein the resinous copolymer is comprised of about 35 percent by weight styrene and about 65 percent by weight methyl methacrylate.

No references cited.

JOSEPH L. SCHOFER, *Primary Examiner.*

J. C. HAIGHT, *Assistant Examiner.*